United States Patent [19]

Haeusler et al.

[11] 4,456,292

[45] Jun. 26, 1984

[54] ELECTROMAGNETIC GRIPPING ARRANGEMENT FOR METALLIC WORKPIECES

[75] Inventors: Jochen Haeusler, Nuremberg; Horst Friemert, Erlangen; Remi Kutchukian, Nuremberg, all of Fed. Rep. of Germany

[73] Assignee: Siemens Aktiengesellschaft, Berlin and Munich, Fed. Rep. of Germany

[21] Appl. No.: 290,312

[22] Filed: Aug. 5, 1981

[30] Foreign Application Priority Data

Aug. 18, 1980 [DE] Fed. Rep. of Germany ....... 3031146

[51] Int. Cl.³ ............................................... B66C 1/04
[52] U.S. Cl. ................................................. 294/65.5
[58] Field of Search ................ 294/65.5, 65; 414/606, 414/737, 744 C; 335/285, 286, 287, 289, 290, 291, 292, 294, 295

[56] References Cited

U.S. PATENT DOCUMENTS 3,139,563 6/1964 Freeman .......................... 294/65.5
3,596,967 8/1971 Carter ............................. 294/65.5

FOREIGN PATENT DOCUMENTS 428365 8/1967 Switzerland ..................... 294/65.5

Primary Examiner—James B. Marbert
Attorney, Agent, or Firm—Kenyon & Kenyon

[57] ABSTRACT

An arrangement for gripping metallic workpieces formed of ferromagnetic materials or electrically highly conductive materials, by means of electromagnetic forcs. In one embodimet, two linear-motor stators perform as gripping elements by producing travelling fields which exert gripping forces on the workpieces. The linear-motor stators may be configured to conform to the geometry of the workpieces, and are supported by at least one gripper arm.

2 Claims, 5 Drawing Figures

ELECTROMAGNETIC GRIPPING ARRANGEMENT FOR METALLIC WORKPIECES

BACKGROUND OF THE INVENTION

This invention relates generally to arrangements for gripping metallic workpieces, and more particularly, to a system which utilizes electromagnetic forces to grip workpieces formed of ferromagnetic or electrically highly conductive materials.

It is a problem with automated manufacturing systems that there has not existed a universal gripping arrangement for handling a variety of materials and product configurations. This problem is particularly acute in automated manufacturing systems which are used to produce small and medium-size production runs of products, where it is not economically feasible to provide customized grippers.

In addition to mechanically operated grippers, other types of gripping arrangements are known, such as vacuum suction grippers, and permanent-magnet or electomagnetic grippers. All of these grippers have serious drawbacks. Mechanical gripping arrangements must customarily be adapted to the workpiece, vacuum grippers impose stringent requirements upon the surface quality of the workpiece, and magnetic grippers can be used only for ferromagnetic workpieces.

It is, therefore, an object of this invention to provide an electomagnetic gripping arrangement which can be utilized for handling ferromagnetic materials, such as iron, cobalt, or nickel; and electrically highly conductive materials, such as copper and aluminum.

SUMMARY OF THE INVENTION

The foregoing and other objects are achieved by this invention which provides a gripping arrangement which utilizes electromagnetic circuits for generating travelling fields for exerting gripping forces.

In one embodiment of the invention, the stators of linear motors are utilized as the electromagnetic circuits. Such stators may be advantageously adapted to conform to the geometry of the workpieces.

It is a feature of the invention that gripping of the workpieces is achieved by means of volume forces which permit versatility with respect to the geometry of a workpiece, and the material from which it is formed.

BRIEF DESCRIPTION OF THE DRAWINGS

Comprehension of the invention is facilitated by reading the following detailed description in conjunction with the annexed drawings, in which.

DETAILED DESCRIPTION

Figure 1A:
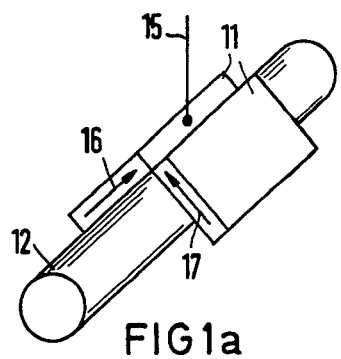
FIG. 1, which is formed of FIGS. 1a, 1b, and 1c, schematically illustrates a linear-motor stator gripping arrangement constructed in accordance with the principles of the invention, in the process of gripping several workpiece configurations.
Figure 1B:
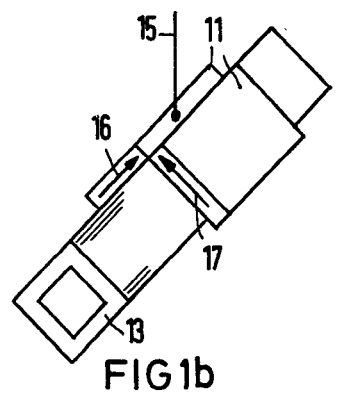
Figure 1C:
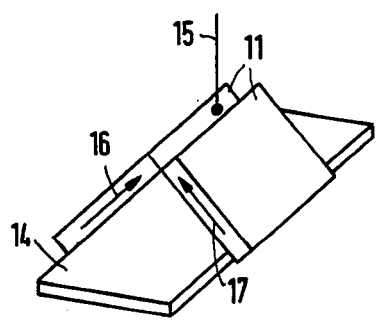

FIG. 1, which consists of FIGS. 1a, 1b and 1c, shows a gripping arrangement formed with two linear-motor stators arranged at right angles to one another. In FIG. 1a, a cylindrical workpiece 12 of ferromagnetic material, such as iron, cobalt or nickel, or of an electrically highly conductive material, such as copper or aluminum, is gripped by two linear-motor stators 11 which are shown to be arranged at 90° with respect to one another. Linear-motor stators 11 form the electromagnetic circuitry which generates travelling fields in the direction of arrows 16 and 17. The travelling fields produce the required gripping forces.

The gripping of workpieces which are formed of electrically highly conductive material is achieved by electrically inducing eddy currents in the material. The linear-motor stators and the grip workpiece are supported by a gripper arm 15, which is only schematically shown in the drawing.

FIG. 1b shows the orthogonally arranged linear-motor stators 11 gripping a rectangularly shaped workpiece 13. The travelling electromagnetic fields which are generated by linear-motor stators 11 are propagated in the directions of arrows 16 and 17.

FIG. 1c shows orthogonal linear-motor stators 11 gripping a rectangular workpiece 14. As previously noted, the travelling fields are propagated in the directions of arrows 16 and 17, and the structure is supported by a gripping arm 15, which is shown schematically in the figures.

Figure 2:
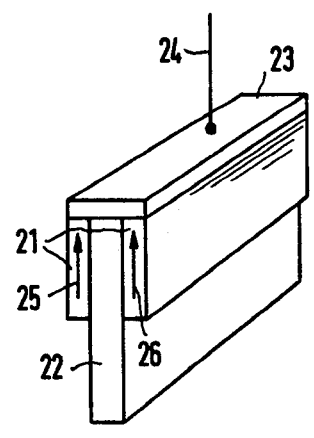
FIG. 2 schematically illustrates a gripping arrangement which utilizes two linear-motor stators arranged parallel to one another.

FIG. 2 shows linear-motor stators 21 arranged parallel to one another. The linear-motor stators are coupled to each other by a stop 23, and are shown gripping a slab 22. The structure shown in this figure is supported by a gripper arm 24 which is only schematically represented. Gripping is achieved by the production of travelling fields which are propagated in the directions of arrows 25 and 26.

Figure 3:
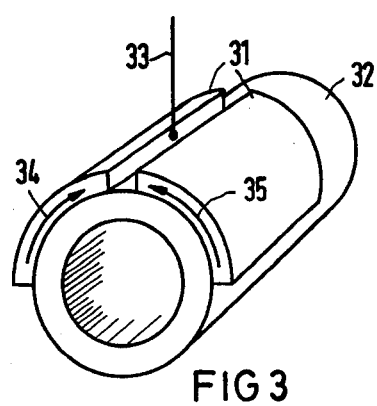
FIG. 3 schematically illustrates a gripping arrangement which utilizes two curved linear-motor stators.

FIG. 3 shows a pair of curved stators 31, each having the cross section of a quarter of a cylinder. The curved stators are shown gripping a cylindrical workpiece 32 by the production of travelling fields which are propagated in the directions of arrows 34 and 35. A gripper arm 33, which is only schematically illustrated in the figure, supports the curved stators and the gripped workpiece.

Although the invention has been described in terms of specific embodiments and applications, other embodiments and applications will be apparent, in light of this teaching, to persons skilled in the pertinent art. For example, it is to be understood that the gripping performance of the stators is improved if their geometry is configured to conform to that of the workpieces. The drawings and descriptions in this disclosure are merely illustrative of the principles of the invention and should not be construed to limit the scope thereof.

What is claimed is:

1. An arrangement for gripping metallic workpieces formed of electrically highly conductive materials, the arrangement being provided with at least one gripping element for producing electromagnetic forces and at least one gripper arm, the arrangement further comprising a linear motor stator circuit for producing travelling magnetic fields in the gripping element and inducing eddy currents in the metallic workpieces, said eddy currents producing magnetic components interacting attractively with said travelling magnetic fields travelling in the direction that the workpieces are to be gripped and thereby exerting gripping forces on the workpieces.

2. The arrangement of claim 2 wherein said linear-motor stator circuit is configured to conform to the geometry of the workpieces.

* * * * *